United States Patent [19]

McArdle

[11] Patent Number: 5,118,964
[45] Date of Patent: Jun. 2, 1992

[54] THERMO-ELECTRIC TEMPERATURE CONTROL ARRANGEMENT FOR LASER APPARATUS

[75] Inventor: James McArdle, Mount Olive Township, Morris County, N.J.

[73] Assignee: AT&T Bell Laboratories, Murray Hill, N.J.

[21] Appl. No.: 588,643

[22] Filed: Sep. 26, 1990

[51] Int. Cl.⁵ .................. H01H 37/10; H01S 3/04
[52] U.S. Cl. ................ 307/117; 372/34; 323/271
[58] Field of Search ........... 219/497; 307/117, 361; 372/34; 357/87; 323/271

[56] References Cited

U.S. PATENT DOCUMENTS

| | | | |
|---|---|---|---|
| 3,633,094 | 1/1972 | Clements | 219/497 X |
| 4,485,475 | 11/1984 | Large et al. | 372/34 X |
| 4,571,728 | 2/1986 | Yoshikawa | 357/87 X |
| 4,631,728 | 12/1986 | Simons | 372/34 X |
| 4,774,499 | 9/1988 | Mapleston | 307/361 X |
| 4,792,957 | 12/1988 | Kollanyi | 372/34 |
| 4,797,837 | 1/1989 | Brooks | 364/519 |
| 4,812,733 | 3/1989 | Tobey | 357/87 X |
| 4,884,279 | 11/1989 | Odagiri | 372/34 X |
| 5,019,769 | 5/1991 | Levinson | 372/31 |

FOREIGN PATENT DOCUMENTS 63-60579   3/1988   Japan ................ 372/34

*Primary Examiner*—A. D. Pellinen
*Assistant Examiner*—Fritz Fleming
*Attorney, Agent, or Firm*—A. G. Steinmetz

[57] ABSTRACT

A thermo-electric laser temperature control apparatus is driven by a switching mode control circuit. Driving current polarity determines if the thermo-electric apparatus is operating in a heat absorbent or heat generating mode. A sequencing control circuit is used in association with the control circuit to define operative ranges of the thermo-electric temperature control apparatus consistent with maintaining proper temperature for a linear operative range for the laser. Feedback circuitry permits precision control of the converter output to limit the operative temperature range of the laser to a small precisely defined temperature window.

5 Claims, 3 Drawing Sheets

THERMO-ELECTRIC TEMPERATURE CONTROL ARRANGEMENT FOR LASER APPARATUS

FIELD OF THE INVENTION

This invention relates to control circuitry and in particular to a temperature control circuit for controlling a temperature of a laser device.

BACKGROUND OF THE INVENTION

With the increased use of fiber optics in telephone and other communication circuits the use of laser devices in amplifying repeating apparatus in the optical communication channels is widespread. Laser devices permit transmission of a plurality of signal channels covering a wide bandwidth range and hence are suitable for both traditional voice channels and varied high rate data and high frequency signal channels all transmitted over a single optical fiber transmission line.

In order to handle a plurality of channels over a wide bandwidth without distortion, the laser device must be operated within its linear temperature region defined by a very narrow operating temperature range. Should the operating temperature of the laser device fall outside of this narrow range the laser device no longer linearly transmits the communication channels over the entire range of the normal bandwidth of the device. Hence in an actual operating environment having a wide range of ambient temperatures, it is necessary to provide temperature control apparatus to maintain the operating temperature of the laser amplifying device within its specified operating temperature range.

SUMMARY OF THE INVENTION

A thermo-electric device and associated laser temperature control circuit is operative for maintaining a laser device within its ideal temperature range. The thermo electric device is supplied a drive current through a switching type temperature control circuit. This drive current is regulated by the switching circuit and is applied to the thermo-electric device to control its heating or cooling effort. The current polarity applied determines if the thermo-electric apparatus is operating in a heat absorbent or heat generating mode. A sequencing control circuit included in the temperature control circuit defines operative ranges of the thermo-electric temperature control circuit in order to maintain a linear operative temperature range for the laser device. Feedback circuitry including and operative through the sequencing control circuit permits precision control of the temperature by controlling current output magnitude and current polarity to limit the operative temperature range of the laser device to within a small precisely defined range of temperatures at which it linearly operates.

In an illustrative application a laser device and its included temperature control may be utilized as a transmission component as part of a telephone system extending fiber optic transmission directly to a home subscriber.

DETAILED DESCRIPTION

Figure 1:
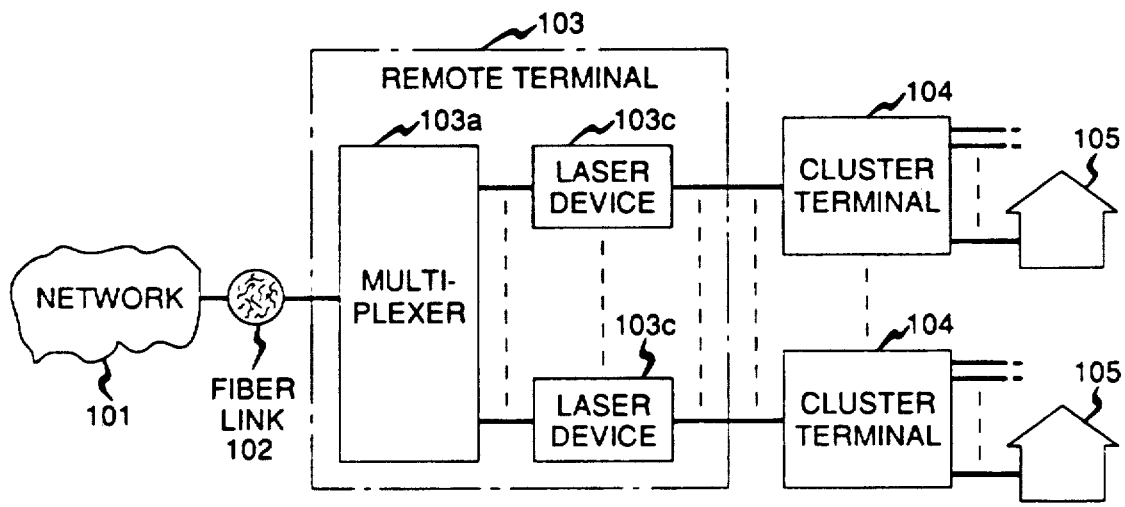
FIG. 1 is a block diagram showing the application of a fiber optic circuit to a telephone communication system.

A portion of a telephone communications transmission system is shown in FIG. 1. Such a system may be used to transmit voice messages, data signals and video signals. Signals segregated in a large number of individual channels supplied from a telephone network 101 are transmitted over a fiber link 102 to a remote terminal 103 which is located in close proximity to a plurality of subscribers. The remote terminal includes circuitry 103a for demultiplexing the channels and distributing subsets of the channels into a plurality of transmission links. Each link includes a laser device 103c carrying the transmitted signals. These signals are in turn coupled to cluster terminals 104 which in turn couple individual optical links to individual subscribers 105.

Each laser device is capable of handling many channels over a wide range or bandwidth of frequency. Its linear operation over the entire frequency bandwidth is critically dependent on maintaining its temperature within a narrow temperature range. Within this narrow temperature range the laser device is capable of carrying signals without significant distortion over a wide frequency range. If the operating temperature falls outside this narrow temperature range the linearity of signal transmission over a substantial portion of the defined bandwidth is significantly degraded.

Figure 2:
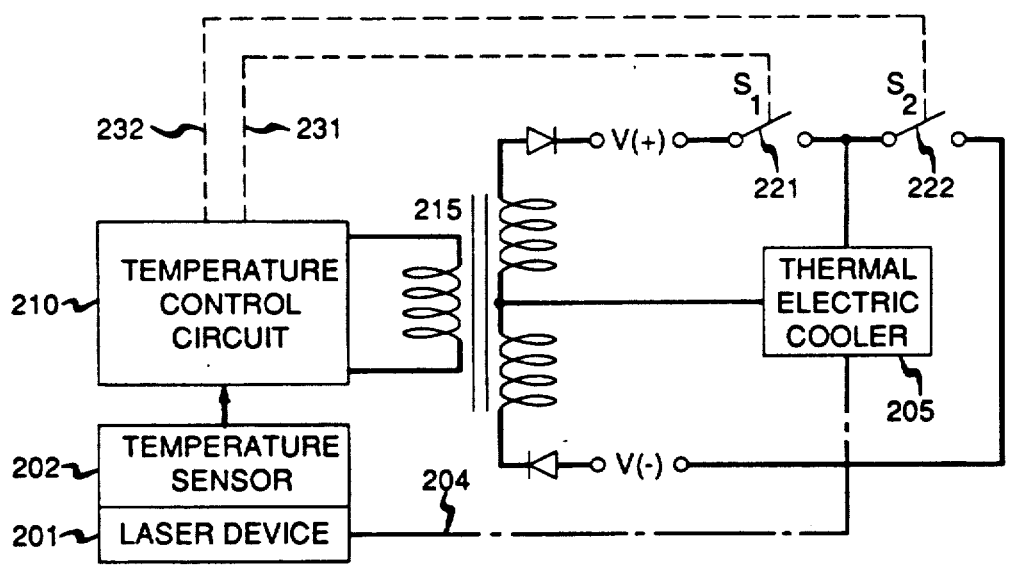
FIG. 2 is a block schematic of the temperature control circuit embodying the principles of the invention.

Laser device temperature is maintained in the illustrative system by using a thermo-electric device controlled by a temperature control circuit. This temperature control arrangement is shown in block schematic form in FIG. 2. A laser device 201 is shown coupled to a temperature sensing device 202 which generates a signal representative of the temperature of the laser device. A thermo-electric cooling device 205 is located physically adjacent to the laser device as schematically shown by dot-dash line 204.

Operation of the thermo-electric cooler 205 is controlled by the switching type temperature control circuit 210 which is coupled to receive a temperature sensing signal from the temperature sensing device 202. The switching control circuit 210 is connected by a power transformer 215, and switches 221 and 222 to the thermo-electric cooler 205. Switching control circuit 210 controls a magnitued of its output current and the selective closure of switches 221 and 222 (shown by symbolic control leads 231, 232) to determine the current direction applied to the thermo-electric cooler 205. Cooling and heating action of the thermo-electric cooler is determined by the direction of current flow and the degree of heating or cooling action is determined by the magnitude of the current. The particular operational characteristics of thermo-electric coolers in themselves are well known and it is not believed necessary to disclose them in detail.

Figure 3:
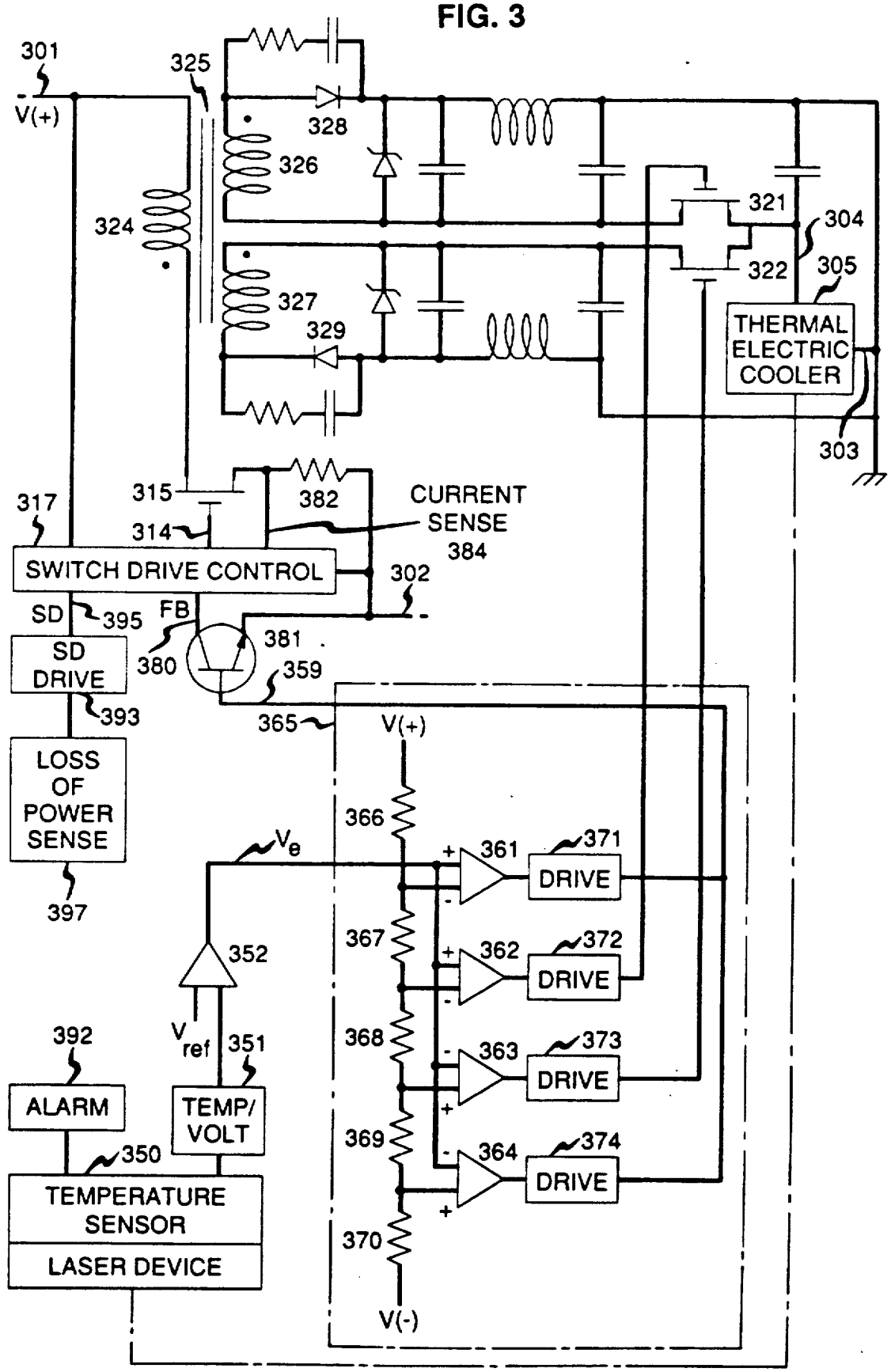
FIG. 3 is a schematic of the temperature control circuit.

The output current magnitude level and the closure of the switches 221 and 222 to control the direction is controlled by the switching control circuit 210, and its associated regulation circuitry whose circuitry is shown in greater detail in FIG. 3. The control circuit shown in detail in FIG. 3 includes a power switch 315, a power transformed 325, and the current direction switches 321 and 322 to control the heating/cooling action of a thermo-electric cooler/heater device 305. Switching of the power switch 315, shown illustratively as an FET, is controlled by a switch drive control circuit 317.

DC input power is applied to the input terminals 301 and 302 and the periodically enabled power switch 315 driven by the switch drive control circuit 317, controls the current flow through the primary winding 324 of transformer 325. Transformer 325 includes two secondary windings 326 and 327 which are coupled, via the diodes 328 and 329, to one terminal 303 of the thermo-electric device 305. The magnitude of current flow through the device is controlled by the duty cycle of the power switch 315 and the direction of current flow is controlled by the selected closure of the switches 321 and 322 both connected to the other terminal 304 at the thermo-electric device 305.

The control circuitry includes a conversion circuit 351 for converting an output of the temperature sensor 350 to a usable voltage level. This voltage is applied to an error amplifier 352 which generates an error signal by relating the temperature voltage to a reference voltage. This generated error voltage is applied in parallel to four comparison circuits 361-364, designated together as part of a hierarchal controller 365. A fixed voltage is applied to a voltage divider which is divided into four different reference voltages by five series connected resistors 366-370. Each individual resistor is sized so that its voltage drop defines a different reference voltage for each of the comparators 361-364. The outputs of these comparators 361-364 are connected to the subsequent drive circuits 371-374. The output of the two drive circuits 371 and 374 are connected to a common node and lead 359 which is in turn connected to a transistor 381 to supply a feedback signal to the switch drive control 317 to control the duty cycle of power switch 315. The respective outputs of the drive circuits 372 and 373 are connected to the switches 321 and 322 in order to control the direction of current applied to the thermo-electric device 305.

It is readily apparent that the error output signal of error amplifier 325 has some midpoint value between the reference thresholds of the comparators 362 and 363. If the error signal varies narrowly from this midpoint it activates one of the two comparators 362 or 363. The activated comparator 362 or 363 determines the direction of current flow applied to the thermo-electric device 305. As the error voltage signal further deviates from this midpoint voltage one at the comparators 361 or 364 is additionally activated to control a duty cycle of the power switch 315 to control current magnitude to actively change the temperature of the laser device by the right amount in the desired direction.

The signal on lead 359 is coupled to a control transistor 381 which transmits the feedback signal to the feedback input 380 of the switch drive control 317. The current output of the power switch is sensed by the current sensing resistor 382 and the voltage there across coupled via lead 384 to the switch drive control 317. In operation the feedback signal applied to the lead 380 in conjunction with the signal on lead 384 controls the output current magnitude to control the thermo-electric device 305 and provides protective current limiting.

Figure 5:
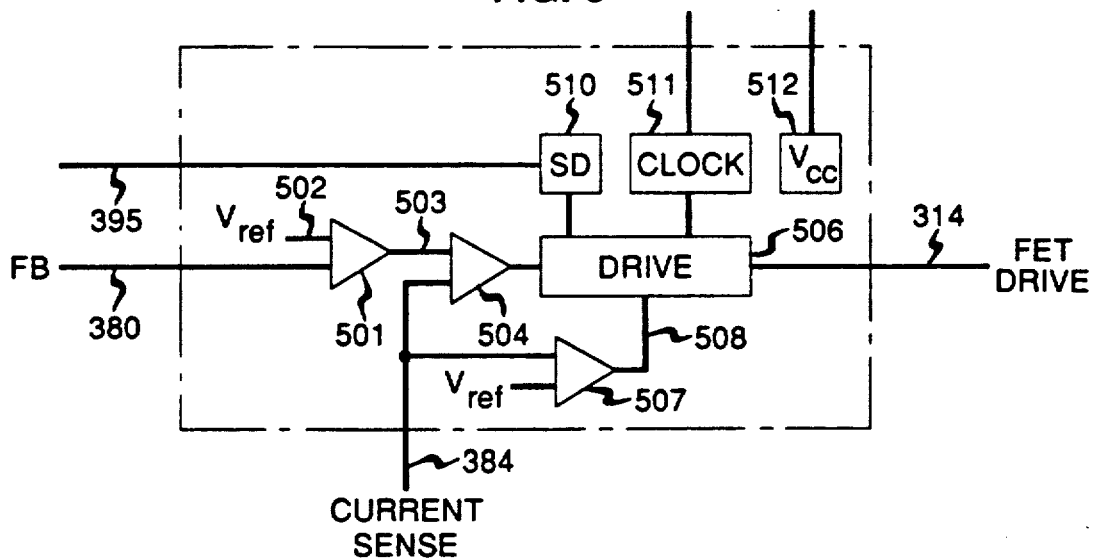

The internal functions of the switch drive control 317 are preferably embodied in a single chip IC such as shown functionally in FIG. 5. The feedback lead 380 is coupled to an error amplifier 501 which has a reference voltage applied to input 502. The error voltage on lead 503 is applied to an amplifier 504 and compared with the current sense voltage on lead 384. The output of amplifier 504 is applied to the drive circuitry 506 whose output is applied to the FET drive lead 314 in order to control the output current magnitude applied to the thermo-electric device. The current sense voltage on lead 384 is also applied to an amplifier 507 whose output on lead 508 redirecting the current level with respect to a reference voltage which serves to shut down the drive circuitry 506 is an overcurrent in resistor 382 is detected. A shut down signal input applied on lead 395 is applied to a shut down circuit 510 whose output is applied to the drive circuitry 506 to shut down its operation. Energizing voltage for the circuitry is applied via leads 511 and 512. While not disclosed in detail those skilled in the art will readily recognized that these functions are readily available in commercial control chips.

Figure 4:
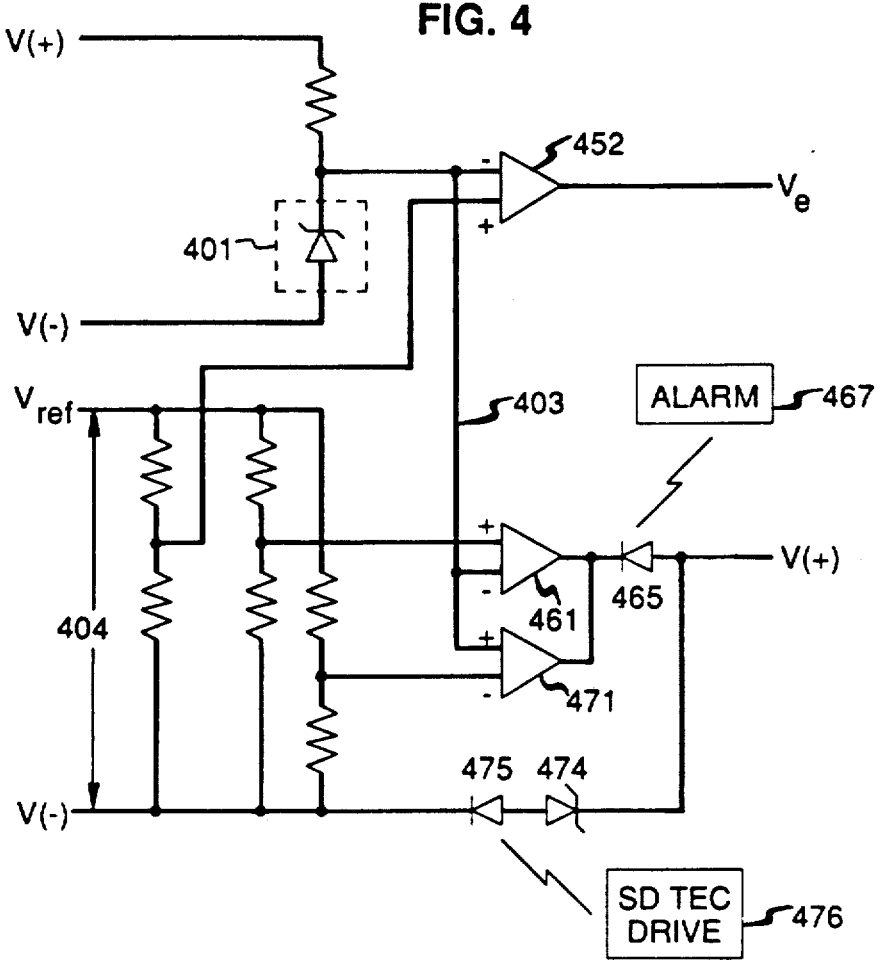
FIGS. 4 and 5 are schematics of control circuitry included in the temperature control circuit.

An output of the temperature sense circuit 250 is connected to an alarm circuit 392. The voltage of the logic circuitry is sensed by circuit 397. The output of this sense circuit is connected to a shutdown drive 393 which shuts down the transmission circuitry and temperature control circuitry if the voltage fails. The function of alarm circuit 392 is to indicate temperature conditions for which the thermo-electric device is unable to correct and the shutdown circuit is operative to shut down the laser device if the transmission logic circuitry voltage is lost. This circuitry is shown in detail in FIG. 4. The laser temperature voltage developed by an integrated circuit type temperature sensor device 401 or other means such as a thermistor sensing scheme is applied to the error amplifier 452 for regulation purposes and to two comparators 461 and 471. Reference voltages generated from voltage dividers shunting a voltage reference 404 are applied to the two comparators 461 and 471. These reference voltages are selected to establish an operating range of temperature control for the laser device 401. If the operating temperature falls outside of this range one of the two amplifiers enables a current flow through the light emitting diode 465 which activates the alarm circuitry 467 to indicate this condition. This arrangement is also operative for disabling the temperature control circuitry and the laser device when the ambient temperature can not be corrected to an operative range. Breakdown device 474 detects a loss of the voltage that powers transmission control circuitry and causes the light emitting diode 475 to activate the shutdown drive 476 for this temperature controller. This arrangement provides a low quiescent current state when operation of the temperature controller is not desired and also prevents inaccurate operation if one or both of the voltage rails fails.

I claim:

1. A temperature control circuit for controlling a temperature of a temperature sensitive device, comprising:
   a thermo-electric device located physically with respect to the temperature sensitive device, in order to apply heating and cooling to the temperature sensitive device,
   a temperature sensor physically coupled for sensing a temperature of the temperature sensitive device,
   means responsive to the temperature sensor for generating a voltage representative of a temperature of the temperature sensitive device,
   power switching circuitry connected for supplying current to the thermo-electric device,
   the power switching circuitry including, a power switch connected to modulate input power and a pulse width modulator to control the power switch, a power transformer including a primary winding connected to the power switch, and a first and second secondary winding providing outputs of a first and second polarity respectively, switched output means including a first direction switch connected to receive a first polarity signal from the first secondary winding, and a second direction switch connected to receive a second polarity signal, opposite in polarity to the first polarity signal, from the second secondary winding, the first and second direction switches being connected to the thermoelectric device and being alternately operative for controlling the direction of current applied to the thermo-electric device, multiple comparison means for comparing the voltage representative of a temperature to multiple reference voltages, a first submultiple of the multiple comparison means connected to the first and second direction switches of the switched output means and operative to control a direction of current flow supplied by the first and second secondary windings of the power switching circuitry and which is applied to the thermo-electric device, and a second submultiple of the multiple comparison means connected to the pulse width modulator and operative for controlling a current magnitude, the multiple comparison means comprising:

the first submultiple including first and second comparator means having first and second reference voltages applied thereto having a first magnitude symmetrical about a midpoint voltage value defining a desired midpoint operating temperature of the laser device, and the first and second comparator means operative for controlling the first and second direction switches respectively, the first and second comparator means being biased by the voltage representative of a temperature to be enabled alternately in response to the temperature sensor reporting a temperature above or below the midpoint operating temperature;

the second submultiple including third and fourth comparator means having third and fourth reference voltages applied thereto which are displaced in magnitude from the midpoint voltage value by a greater magnitude than the first and second reference voltages are displaced from the midpoint voltage value and the third and fourth comparator means being connected to the pulse width modulator, and the third and fourth comparator being responsive to a voltage representative of a temperatuare and the third and fourth comparator means being operative for actively controlling a duty cycle of the power switch of the power switching circuitry to control the current magnitude applied to the thermo-electric device, the third and fourth comparator means being selectively operative in cooperation with the first and second comparator means respectively when the voltage representative of a temperature exceeds one of the third and fourth reference voltage.

2. A thermo-electric temperature control circuit as claimed in claim 1, comprising:

shut down circuitry responsive to the temperature sensor and operative for disabling the temperature control circuitry device if the temperature is outside controllable range.

3. A thermo-electric device control circuit for controlling a temperature of a laser device, comprising:

a thermo-electric device physically connected to a laser device;

a power switching circuit having a power switch with a controlled duty cycle connected for applying a current to the thermo-electric device, a power transformer including a primary winding and a first and second secondary winding for supplying opposite polarity outputs respectively, the power switch connected to periodically energize the primary winding, means for controlling a direction and a magnitude of the current comprising:

means for generating a voltage reponsive to a temperature of the laser device;

means responsive to the voltage for controlling the duty cycle to control a magnitude of the current of the power switch applied to the thermo-electric device; and switching circuitry including first and second switch, connected for coupling the opposite polarity current outputs of the first and second secondary winding to the thermo-electric device in one of at least a first direction from the first secondary winding and a second direction opposite the first direction from the second secondary winding;

circuitry responsive to the voltage to control the switching circuitry to at least select one of the first and second direction in order to maintain the laser device at a desired temperature, and selectively control a current magnitude if necessary to maintain the desired temperature, the circuitry responsive to the voltage including a first, second, third and fourth comparator each biased by a first, second, third and fourth voltage reference each reference voltage having different magnitudes and the magnitude being arranged in a linear arrangement of four voltages about a midpoint voltage respectively;

the second and third comparator being biased to be operative in the alternative depending upon a level of the voltage being greater than or less than a second and third reference voltage mangnitude nearest the midpoint voltage and connected to the switching circuitry to control direction of current applied to the thermo-electric device; and the first comparator being biased to generate a signal to control a magnitude of the current of the power switch in response to a voltage greater than the first mangitude when the second comparator is controlling the direction of current; and the fourth comparator being biased to generate a signal to control a magnitude of the current of the power switch in response to a voltage less than the third magnitude when the third comparator is controlling the direction of current.

4. A thermo-electric device control circuit as claimed in claim 3, comprising:

shutdown circuitry for disabling the power switching circuit when the control circuit senses a loss of voltage.

5. A thermo-electric device control circuit as claimed in claim 4, comprising:

alarm circuitry for indicating inability of the control circuitry to maintain a proper operative temperature for the laser device.

* * * * *